United States Patent [19]
Marr et al.

[11] Patent Number: 5,675,082
[45] Date of Patent: Oct. 7, 1997

[54] GONIOMETER LOADER FOR TESTING THE HEIGHT OF A DISK DRIVE HEAD GIMBAL ASSEMBLY

[75] Inventors: John D. Marr, Escondido; Pat Lee, San Diego, both of Calif.

[73] Assignee: Phase Metrics, San Diego, Calif.

[21] Appl. No.: 561,691

[22] Filed: Nov. 22, 1995

[51] Int. Cl.⁶ .................................................. G01B 11/14
[52] U.S. Cl. .................................. 73/432.1; 356/357
[58] Field of Search ........................... 73/432.1; 356/357, 356/243; 324/212

[56] References Cited

U.S. PATENT DOCUMENTS 5,410,402  4/1995  Li et al. ......................... 356/357

FOREIGN PATENT DOCUMENTS 0191907  8/1986  Japan ............................ 356/357

Primary Examiner—Robert Raevis
Attorney, Agent, or Firm—Blakely Sokoloff Taylor & Zafman

[57] ABSTRACT

A hard disk drive flying height tester loader which moves a head gimbal assembly (HGA) about the pivot axis of the HGA. The HGA is mounted to a clamp that is attached to a pivot arm. The pivot arm is attached to a cam follower which follows a cam. The cam is moved by a motor that is attached to a stationary sideplate. Movement of the cam rotates the pivot arm, clamp and HGA between a first position and a second position. The pivot arm is Coupled to the stationary sideplate by a ball bearing assembly which has a radius of curvature. The center of the ball bearing radius intersects the pivot axis of the HGA so that the clamp and HGA rotate about the pivot axis when the motor and cam move the pivot arm between the first and second positions.

17 Claims, 4 Drawing Sheets

GONIOMETER LOADER FOR TESTING THE HEIGHT OF A DISK DRIVE HEAD GIMBAL ASSEMBLY

BACKGROUND THE INVENTION

1. Field of the Invention

The present invention relates to a loader for a flying height tester of a hard disk drive head gimbal assembly.

2. Description of Related Art

Hard disk drives contain magnetic heads which magnetize and sense the magnetic field of a disk. Each head is typically incorporated into a slider that is mounted to a suspension arm. The slider, head and suspension arm are commonly referred to as a head gimbal assembly (HGA). The sliders have aerodynamic features that create an air bearing between the head and a rotating disk. The air bearing prevents an excessive wear of the magnetic head.

The height of the air bearing is critical to the operation of the disk drive. An air bearing that is to large may degrade the electrical performance of the head. An air bearing that is too small may cause undesirable contact and wear between the heads and the disk. To insure that the head gimbal assemblies comply with manufacturing tolerances, the HGAs are typically tested with flying height teeters before being installed into the drive.

Flying height testers have loaders which move an HGA adjacent to a transparent test disk. The disk is spun and an optical system measures the height of the air bearing. Because the optical properties of each slider may vary, the optical system must be calibrated for each HGA tested. Calibration typically includes moving the sliders between two positions and obtaining data with the optical system. When moving the magnetic head during calibration it is preferable to rotate the HGA about the same pivot axis that the suspension arm pivots about when installed and operating with the disk drive unit. Movement of the HGA about a different axis may introduce an additional variation in the angle between the slider and the disk. Any relatively large deviation in the slider angle may change the aerodynamics of the slider and cause the head to crash into the disk during the test. It would therefore be desirable to provide a flying height tester loader which moved the head without introducing an additional slider angle.

SUMMARY OF THE INVENTION

The present invention is a hard disk drive flying height tester loader which moves a head gimbal assembly (HGA) about the pivot axis of the HGA. The HGA is mounted to a clamp that is attached to a pivot arm. The pivot arm is attached to a cam follower which follows a cam. The cam is moved by a motor that is attached to a stationary side plate. Movement of the cam rotates the pivot arm, clamp and HGA between a first position and a second position. The pivot arm is coupled to the stationary sideplate by a ball bearing assembly which has a radius of curvature. The center of the ball bearing radius intersects the pivot axis of the HGA so that the clamp and HGA rotate about the pivot axis when the motor and cam move the pivot arm between the first and second positions.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
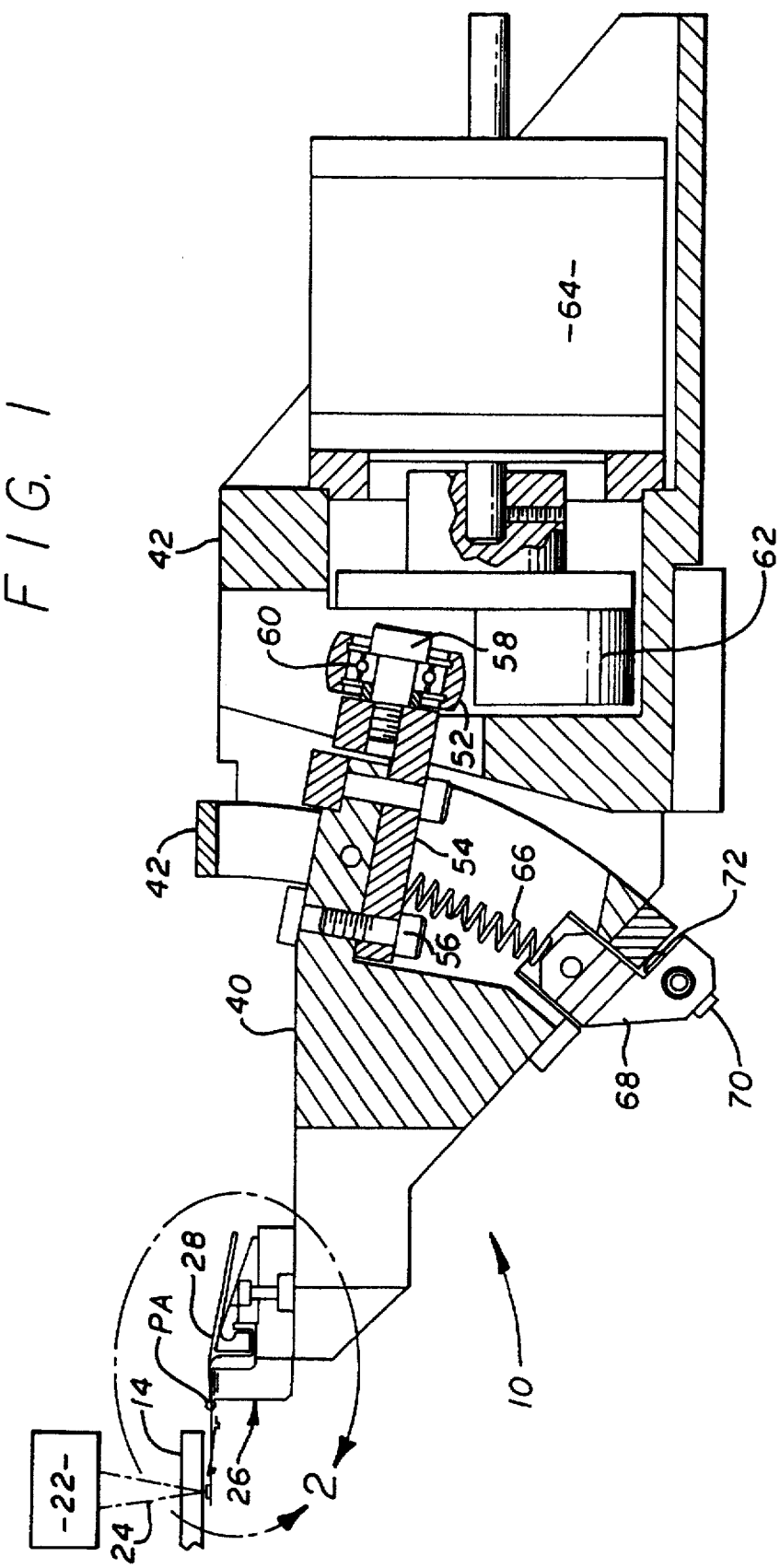
FIG. 1 is a side cross-sectional view of a hard disk drive flying height tester loader of the present invention.
Figure 2:
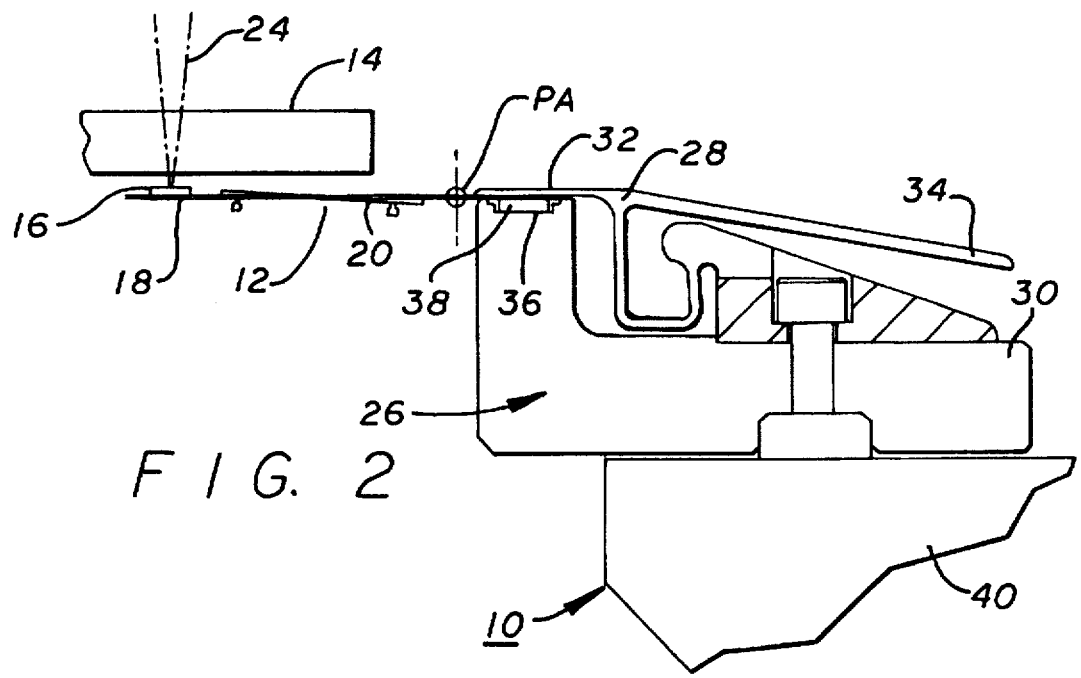
FIG. 2 is an enlarged view of a clamp of the loader.

Referring to the drawings more particularly by reference numbers, FIGS. 1–4 show a hard disk drive flying height tester loader 10 of the present invention. The loader 10 loads a head gimbal assembly (HGA) 12 onto a disk 14. The HGA 12 includes a head 16 that is integrated into a slider 18. The slider 18 is mounted to a suspension arm 20. The tester typically contains an optical system 22 that measures the height of an air bearing created between the slider 18 and the disk 14. The disk 14 is typically transparent so that the optical system 22 can measure the change in state of a reflected light beam 24 to determine the air bearing height. When installed into a hard disk drive the HGA 12 has a pivot axis PA about which the suspension arm 20 bends when the air bearing is created by a rotating disk.

The HGA 12 is mounted to a clamp assembly 26. The clamp assembly 26 includes a spring 28 that is attached to a base plate 30. The spring 28 has a lip 32 that presses an end of the suspension arm 20 into the base plate 30 to capture the HGA 12. The spring 28 has a lever 34 that can be depressed by an operator so that a tested HGA can be replaced with another part. The base plate 30 preferably has an alignment aperture 36 that receives the swag boss 38 of the suspension arm 20 to align the HGA 12 with the disk 14.

Figure 3:
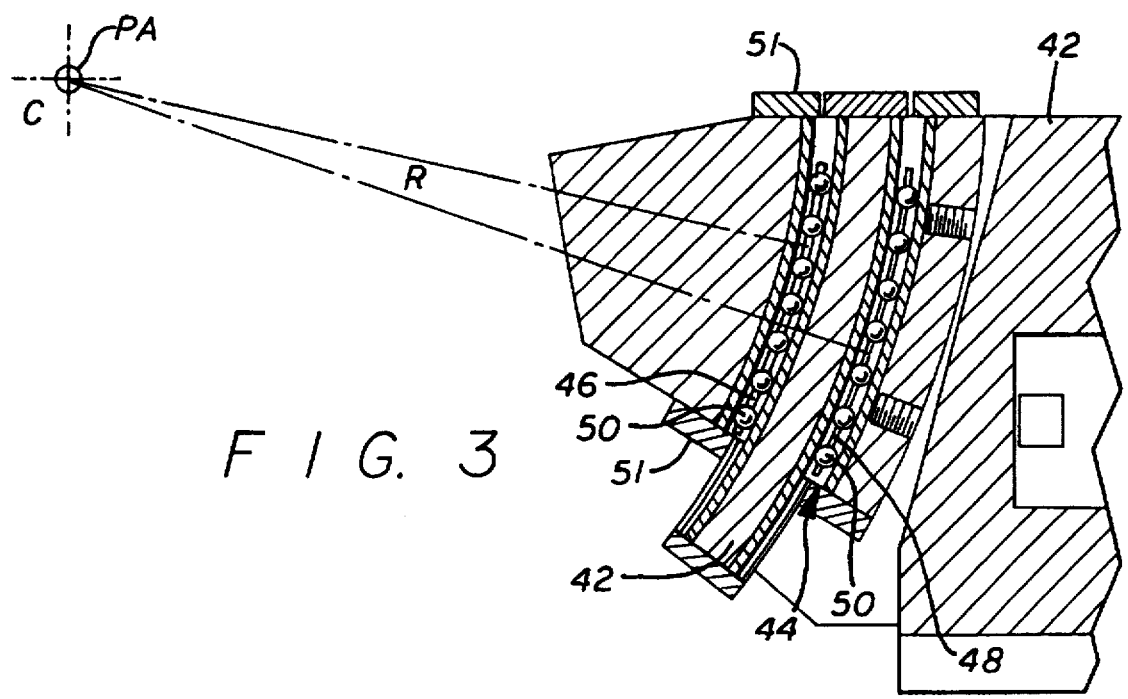
FIG. 3 is a sectional view of the loader showing a ball bearing assembly.
Figure 4:
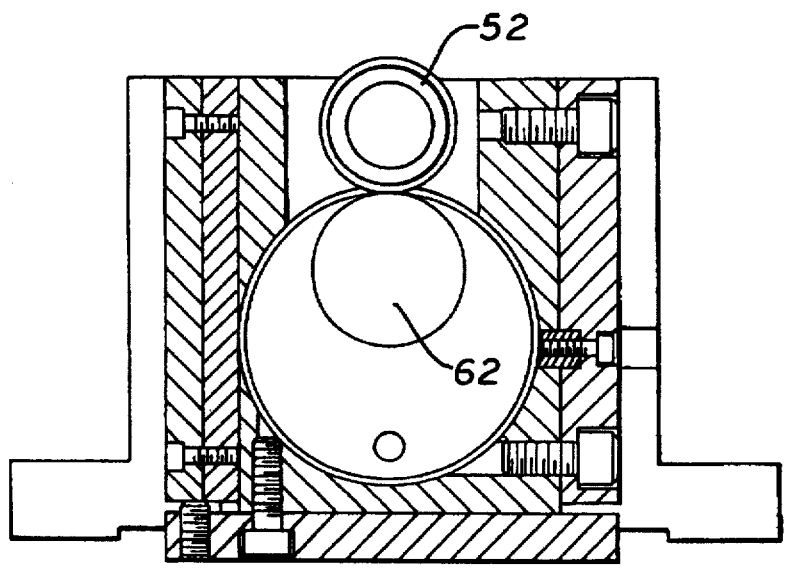
FIG. 4 is a front sectional view of a cam assembly of the loader.

The clamp assembly 26 is mounted to a pivot arm 40 that can move the HGA 12 between a first position and a second position. The pivot arm 40 is coupled to a stationary side plate 42 by a ball bearing assembly 44. As shown in FIG. 3, the ball bearing assembly 44 includes two races 46 and 48 that capture a plurality of balls 50. The races 46 and 48 are enclosed by retainer plates 51. The ball bearing assembly 44 allows the pivot arm 40 to move relative to the stationary side plate 42.

Each race 46 and 48 has a radius of curvature R that has a center C located at the pivot axis PA of the HGA 12. locating the curvature center C of the bearing assembly 44 at the pivot axis, the clamp assembly 26 and HGA 12 will rotate about the pivot axis PA of the suspension arm 20 when the pivot arm 40 is moved between the first and second positions. Rotation about the pivot axis prevents an undesirable additional slider angle when the HGA 12 is moved between the two positions.

The loader 10 includes a cam follower 52 that is coupled to the pivot arm 40 by a follower arm 54. The follower arm 54 may be attached to the pivot arm 40 by screws 56. The follower 52 may be attached to the arm 54 by a screw 58. The loader 10 may further have a bearing 60 that allows the follower 52 to rotate about the screw 58.

The cam follower 52 follows an eccentric cam 62 that attached to a motor 64. The motor 64 rotates the cam 62 and moves the cam follower 52. The movement of the cam follower 52 pivots the pivot arm 40 and moves the head 16 relative to the disk 14.

The loader 10 further includes a tension spring 66 that is attached to the side plate 42 and the pivot arm 40. The spring 66 biases the pivot arm 40, clamp assembly 26 and HGA 12 toward the first position. The tension spring 66 also prevents the pivot arm 40 from floating out of position.

Extending from the side plate 42 is an adjustment arm 68 that has an adjustable screw 70. The screw tip 72 provides a stop for the pivot arm 40, when the arm 40 is in the first position. The location of the first position can be adjusted by turning the screw 70 and varying the length of the screw tip 72.

Figure 5:
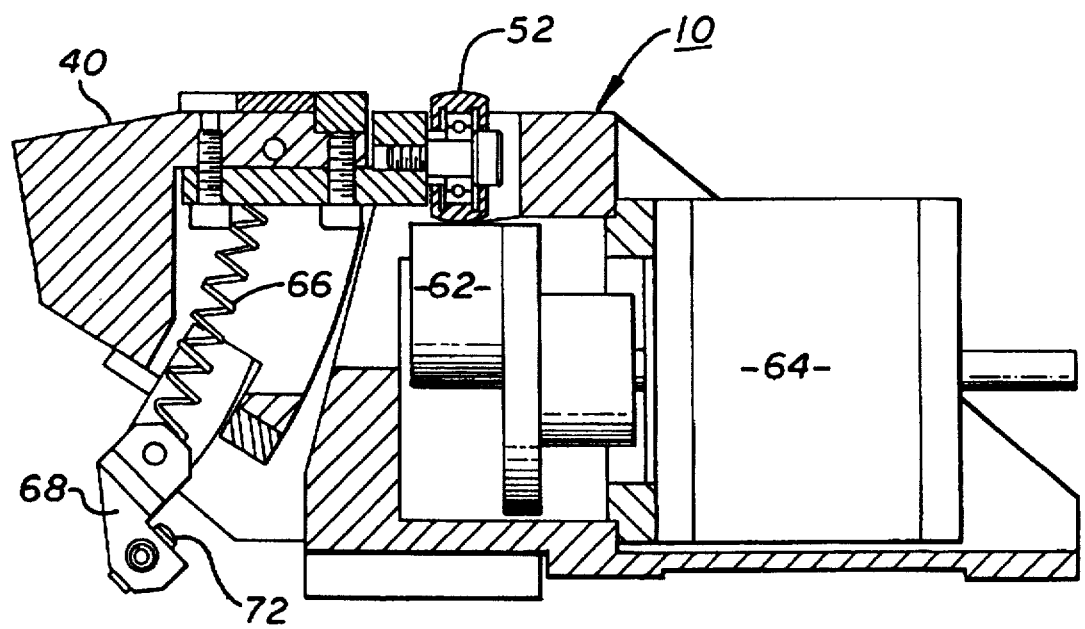
FIG. 5 is a side cross-sectional view of the loader in a second position.

In operation, the test operator loads an HGA 12 onto the clamp assembly 26. As shown in FIG. 5, the motor 64 rotates the cam 62 and moves the pivot arm 40 and HGA 12 from the first position to the second position. The entire loader is then moved so that the head 16 is moved under the disk 14. In the second position the HGA is farther away from the disk. The pivot arm 40 is moved to the second position before the HGA 12 is moved under the disk 14 to insure that the slide 18 does not strike the disk 14.

After the HGA 12 is moved under the disk 14 the motor 64 moves the pivot arm 40 and HGA 12 between the first and second positions to calibrate the optical system 44. After calibration, the flying height of the HGA 12 is tested. After testing the flying height, the pivot arm 40 is again moved to the second position and the HGA 12 is moved away from the disk 14. The operator can replace the HGA 12 with another part and repeat the test procedure.

Figure 6:
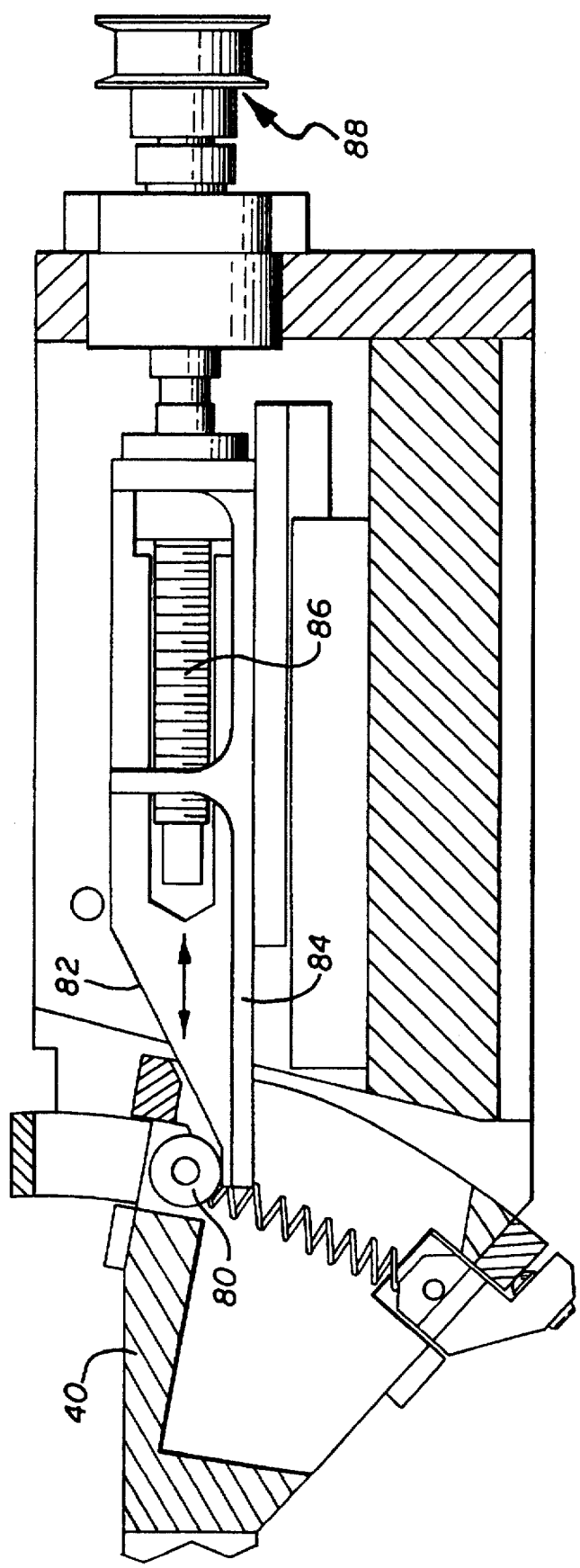
FIG. 6 is an alternate embodiment of the loader of FIG. 1.

FIG. 6 shows an alternate embodiment of a loader which has a different moving mechanism than the motor 64 and eccentric cam 62 shown in FIGS. 1–5. The pivot arm 40 has a cam follower 80 that follows the surface of a ramped cam 82 which moves along a track 84. The ramped cam 82 has internal threads that are coupled to a ball screw 86. The ball screw 86 is rotated by an external motor (not shown) through a belt assembly 88.

Rotation of the ball screw 86 causes a linear translational movement of the ramped cam 82 as indicated by the arrows. The linear movement of the ramped cam 82 moves the cam follower 80 and rotates the pivot arm 40 between the first and second positions. Movement of the pivot arm 40 follows the shape of the bearing assembly 44, which directs the arm 40 and HGA 12 to rotate about the pivot axis of the suspension beam 20.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A goniometer loader for testing a head gimbal assembly which has a pivot axis, comprising:
    a clamp that clamps the head gimbal assembly;
    a pivot assembly that is attached to said clamp so that the head gimbal assembly rotates about the pivot axis of the head gimbal assembly between a first position and a second position, and,
    a movement assembly that moves said pivot assembly and the head gimbal assembly between the first position and the second position.

2. The loader as recited in claim 1, wherein said pivot assembly has an adjustment assembly that can vary a location of the first position.

3. The loader as recited in claim 1, wherein said pivot assembly includes a ball bearing assembly that has a first race and a second race that are coupled to a pivot arm and a side plate, said pivot arm being attached to said clamp and moved by said movement assembly, said ball bearing assembly having a radius of curvature with a center located on the pivot axis, so that said pivot arm rotates about the pivot axis when said movement assembly moves said pivot arm.

4. The loader as recited in claim 3, wherein said pivot assembly includes a tension spring that is attached to said side plate and said pivot arm to bias said pivot arm into the first position.

5. The loader as recited in claim 3, wherein said movement assembly includes an eccentric cam that is rotated by a motor, said eccentric cam moves a cam follower that is attached to said pivot arm.

6. The loader as recited in claim 3, wherein said movement assembly includes a ramped cam that is translated by a ball screw motor assembly, said ramped cam moves a cam follower that is attached to said pivot arm.

7. A goniometer loader for testing a head gimbal assembly which has a pivot axis, comprising:
    clamp means for clamping the head gimbal assembly;
    pivot means for rotating the head gimbal assembly about the pivot axis of the head gimbal assembly between a first position and a second position; and,
    movement means for moving said clamp means and the head gimbal assembly between the first position and the second position.

8. The loader as recited in claim 7, wherein said pivot means has adjustment means for varying a location of the first position.

9. The loader as recited in claim 7, wherein said pivot means includes a ball bearing assembly that has a first race and a second race that are coupled to a pivot arm and a side plate, said pivot arm being attached to said clamp and moved by said movement means, said ball bearing assembly having a radius of curvature with a center located at the pivot axis so that said pivot arm rotates about the pivot axis when said movement means moves said pivot arm.

10. The loader as recited in claim 9, wherein said pivot means includes a tension spring that is attached to said side plate and said pivot arm to bias said pivot arm into the first position.

11. The loader as recited in claim 9, wherein said movement means includes an eccentric cam that is rotated by a motor, said eccentric cam moves a cam follower that is attached to said pivot arm.

12. The loader as recited in claim 9, wherein said movement means includes a ramped cam that is translated by a ball screw motor assembly, said ramped cam moves a cam follower that is attached to said pivot arm.

13. A goniometer loader for testing a head gimbal assembly which has a pivot axis, comprising:
    a clamp that clamps the head gimbal assembly;
    a pivot arm that is attached to said clamp and moves between a first position and a second position;
    a side plate;
    a ball bearing assembly coupled to side pivot arm and said sideplate, said ball bearing assembly having a radius of curvature that has a center located on the pivot axis of the head gimbal assembly, wherein said pivot arm rotates about the pivot axis when said pivot arm moves between the first and the second position; and,
    a movement assembly that moves said pivot arm, said clamp and the head gimbal assembly between the first position and the second position.

14. The loader as recited in claim 13, further comprising an adjustable screw that is attached to said side plate and which engages said pivot arm so that the first position can be varied.

15. The loader as recited in claim 14, further comprising a tension spring that is attached to said side plate and said pivot arm to bias said pivot arm into the first position.

16. The loader as recited in claim 15, wherein said movement assembly includes an eccentric cam that is rotated by a motor, said eccentric cam moves a cam follower that is attached to said pivot arm.

17. The loader as recited in claim 15, wherein said movement assembly includes a ramped cam that is translated by a ball screw motor assembly, said ramped cam moves a cam follower that is attached to said pivot arm.

* * * * *